United States Patent [19]

Read

[11] 4,449,605
[45] May 22, 1984

[54] DEVICE FOR PREVENTING THEFT OF MOTOR VEHICLES

[76] Inventor: William A. Read, 35631 Cabral Dr., Fremont, Calif. 94536

[21] Appl. No.: 246,853

[22] Filed: Mar. 23, 1981

[51] Int. Cl.³ .................................................. B60R 25/08
[52] U.S. Cl. .............................. 180/287; 307/10 AT; 340/64
[58] Field of Search .................. 180/287; 200/44; 307/10 AT; 340/64

[56] References Cited

U.S. PATENT DOCUMENTS

| | | | |
|---|---|---|---|
| 3,343,625 | 9/1967 | Scheuermann | 340/64 |
| 3,382,689 | 5/1968 | Simeone | 70/243 |
| 3,614,460 | 10/1971 | Hale et al. | 340/64 X |
| 3,630,306 | 12/1971 | Shur | 180/287 |
| 3,637,037 | 1/1972 | Doland et al. | 340/64 |
| 3,639,772 | 2/1972 | Wilson | 307/10 |
| 3,654,602 | 4/1972 | Jones | 340/64 |
| 3,694,805 | 9/1972 | Cashman | 340/64 |
| 3,720,284 | 3/1973 | Myers | 180/287 |
| 3,855,828 | 12/1974 | Verderber | 70/243 |
| 3,907,060 | 9/1975 | Burton et al. | 180/287 |
| 3,910,372 | 10/1975 | Mozzar | 180/287 |
| 3,961,310 | 6/1976 | Grant | 340/65 |
| 3,968,666 | 7/1976 | MacKinnon | 70/243 |
| 4,063,610 | 12/1977 | Shilling | 180/287 X |
| 4,148,372 | 4/1979 | Schroeder | 180/287 |

*Primary Examiner*—Joseph F. Peters, Jr.
*Assistant Examiner*—Michael Mar
*Attorney, Agent, or Firm*—Francis H. Lewis

[57] ABSTRACT

Electric disabling circuits and components are provided for preventing theft or unauthorized use of motor vehicles. An auxiliary electrical switch is mounted on the housing of the ignition or starter key cylinder, and is connected to a fuse in the main electrical circuit. When the key cylinder is removed and the ignition or starter switch is shorted, this auxiliary switch causes the fuse to blow out and disable the electrical system in the vehicle. The ignition or starter switch actuates a relay, which in turn is connected to a valve mechanism in the fuel line and the ignition coil or starter through independent circuits. Actuation of the relay causes electrical power to be delivered to the fuel valve and ignition coil or starter. When the relay is de-actuated, the ignition coil is grounded, and the vehicle cannot be started with a jumper wire. A further switch is provided for disabling the relay.

14 Claims, 6 Drawing Figures

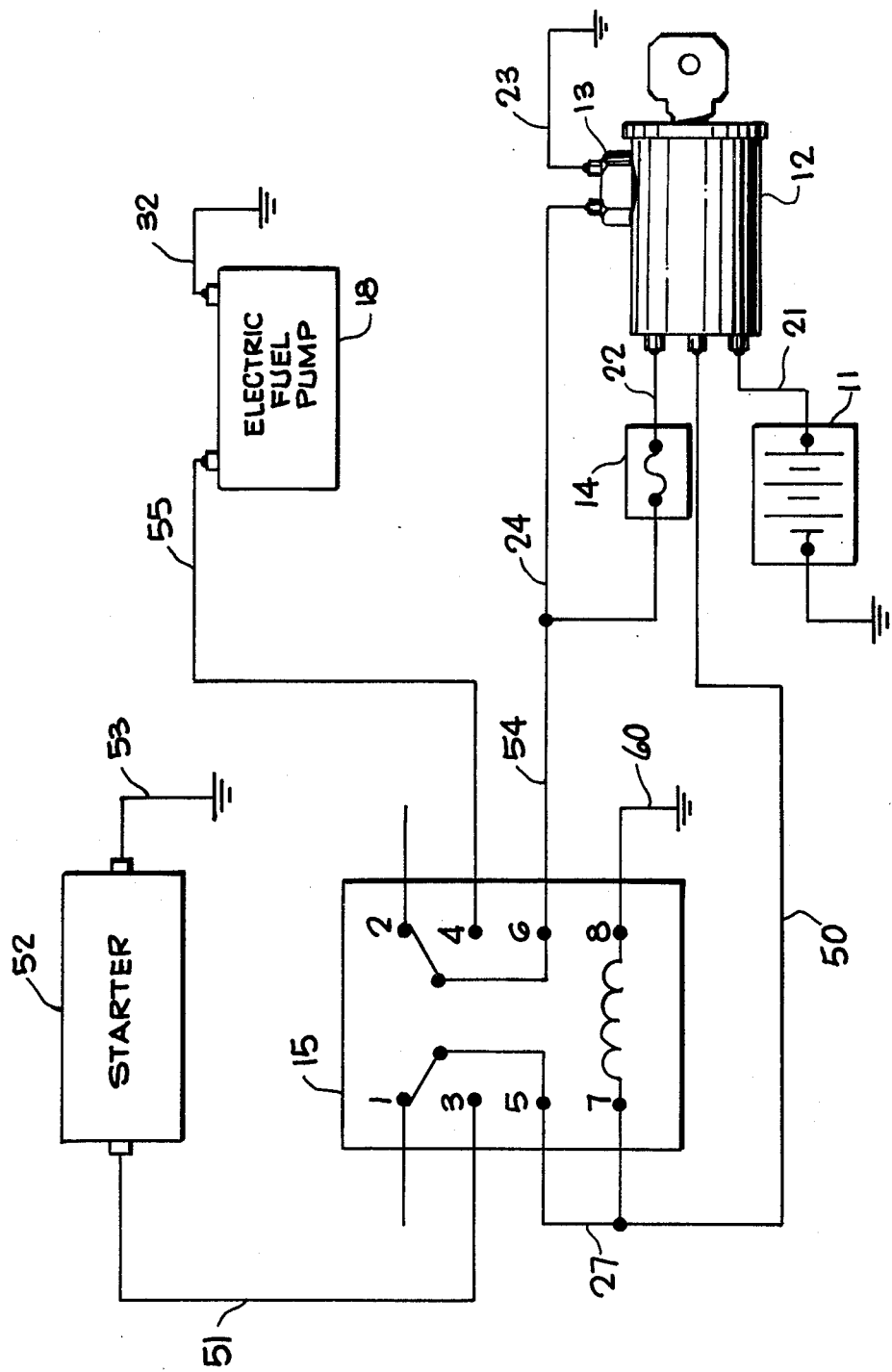

DEVICE FOR PREVENTING THEFT OF MOTOR VEHICLES

BACKGROUND OF THE INVENTION

This invention relates generally to devices for preventing theft or unauthorized operation of vehicles or machinery powered by internal combustion engines, and more specifically, to devices for preventing automobile thefts by disablement of the fuel supply and ignition or starter systems.

The key-operated ignition switch is the most widely used device for discouraging theft or unauthorized use of motor vehicles. It is well-known that this device suffers from certain deficiencies as a deterrent to automobile theft. The device only acts as an electrical switch for tthe ignition system, and a thief may defeat its purpose simply by connecting a jumper wire directly from the battery to the ignition coil. Furthermore, in many automobiles the ignition key cylinder is notoriously easy to remove from its housing, leaving the electrical switch contacts exposed. These contacts may then be crossed and connected by a metallic foreign object, and the car can be easily driven away. In fact, professional thieves are often known to carry spare key cylinders, and they are able to steal a car very quickly by removing the key cylinder from its housing and substituting a spare cylinder, thereupon driving the car in the normal manner.

A variety of devices supplementing the ignition key switch have been proposed and designed for frustrating the efforts of car thieves. Such devices include electrically or hydraulically actuated solenoids and valves for shutting off the fuel supply or locking the brakes in order to disable the vehicle. These devices sometimes employ a second switch in addition to the ignition switch, the second switch being positioned in a location that is difficult to find or inaccessible. These devices are an inconvenience to the normal user of the vehicle, and the location of the auxiliary switch may be discovered by an experienced thief. Other devices of this type employ an auxiliary switch which is operated with a second key, an electrically coded plastic card, or similar means. Such means are also inconvenient for the normal user, and suffer from the same drawbacks as the ignition key switch. Finally, all these devices may be defeated by appropriate jumper wires to the valves or solenoids and the ignition coil.

Another class of devices involves substantial modification of the ignition key switch itself, and other components of the ignition system, to disable the vehicle. For example, ignition switches have been proposed having internal electric switches or hydraulic valves for shutting off the fuel supply when the key is turned off. Other ignition switches have been designed which employ a special "resistor coded" key, such as the system described in the patent to Schroeder, U.S. Pat. No. 4,148,372. Such devices entail substantial expense and complexity of design, and are not readily adaptable to existing motor vehicles. Their operation may often be thwarted by connecting jumpers or by disconnecting their associated wiring.

SUMMARY OF THE INVENTION

The present invention is a device for disabling simultaneously both the fuel supply and the ignition coil of a motor vehicle when the ignition switch key is turned off. The device includes a double-pole double-throw relay operated by a wire from the ignition switch, which is mounted in a hidden and inaccessible location in the vehicle. When the key is turned off, the relay disconnects the ignition coil from the battery or electrical power supply in the vehicle, and simultaneously connects the coil to ground. In vehicles having an electrically operated fuel pump, the circuits for the fuel pump and the ignition coil are electrically isolated from each other by means of the relay. In vehicles having a mechanically driven fuel pump, the device includes an electrically actuated solenoid valve in the fuel line connected to the ignition switch, which shuts off the fuel supply when the ignition key is turned off, and which is isolated from the ignition coil circuit by means of the relay.

The device also includes a hidden fuse in the ignition circuit and an auxiliary spring-biased switch mounted on the ignition key cylinder housing in an inaccessible position. The auxiliary switch is connected between the ignition circuit and ground, and is turned on when the ignition key cylinder is removed. When the ignition switch contacts are thereupon connected, the fuse is blown and the entire electrical system is disabled. The spring-driven auxiliary switch also projects a plunger into the key cylinder opening, thereby preventing the insertion of a spare key cylinder.

An alternate version of the device for application to rental cars provides a second auxiliary switch, which is hidden or key-operated, connected to the actuating circuit of the relay. When this hidden switch is turned off the relay is de-activated, and the ignition system is thereby disabled.

A further alternative version of the device is adapted for use in diesel-powered vehicles, which have no ignition system. In this version the relay controls the electric starter motor circuit and the electric fuel pump or solenoid fuel valve circuit, and isolates these circuits from each other. When the key is turned off, the relay disables the starter motor and shuts off the fuel line simultaneously.

It is a general object of this invention to provide a novel and improved system for preventing thefts and unauthorized use of motor vehicles.

A more particular object of this invention is to provide a system for preventing thefts which is not susceptible to defeat by the use of jumper wires or auxiliary connections to the ignition system of a motor vehicle.

Another object is to provide a simple and inexpensive anti-theft system which is adaptable to both gasoline and diesel-powered motor vehicles.

A further object is to provide an anti-theft system which cannot be defeated by the removal or substitution of the ignition key cylinder of a motor vehicle.

Yet another object of this invention is to provide an anti-theft system for motor vehicles which may be activated solely by turning off the ignition key switch.

These and other objects, characteristics, and features of this invention may be better understood by examining the following drawings, together with the detailed description.

BRIEF DESCRIPTION OF THE DRAWINGS

FIG. 6 is a schematic illustration of the present invention installed in a diesel-powered motor vehicle.

DETAILED DESCRIPTION OF THE INVENTION

Figure 1:
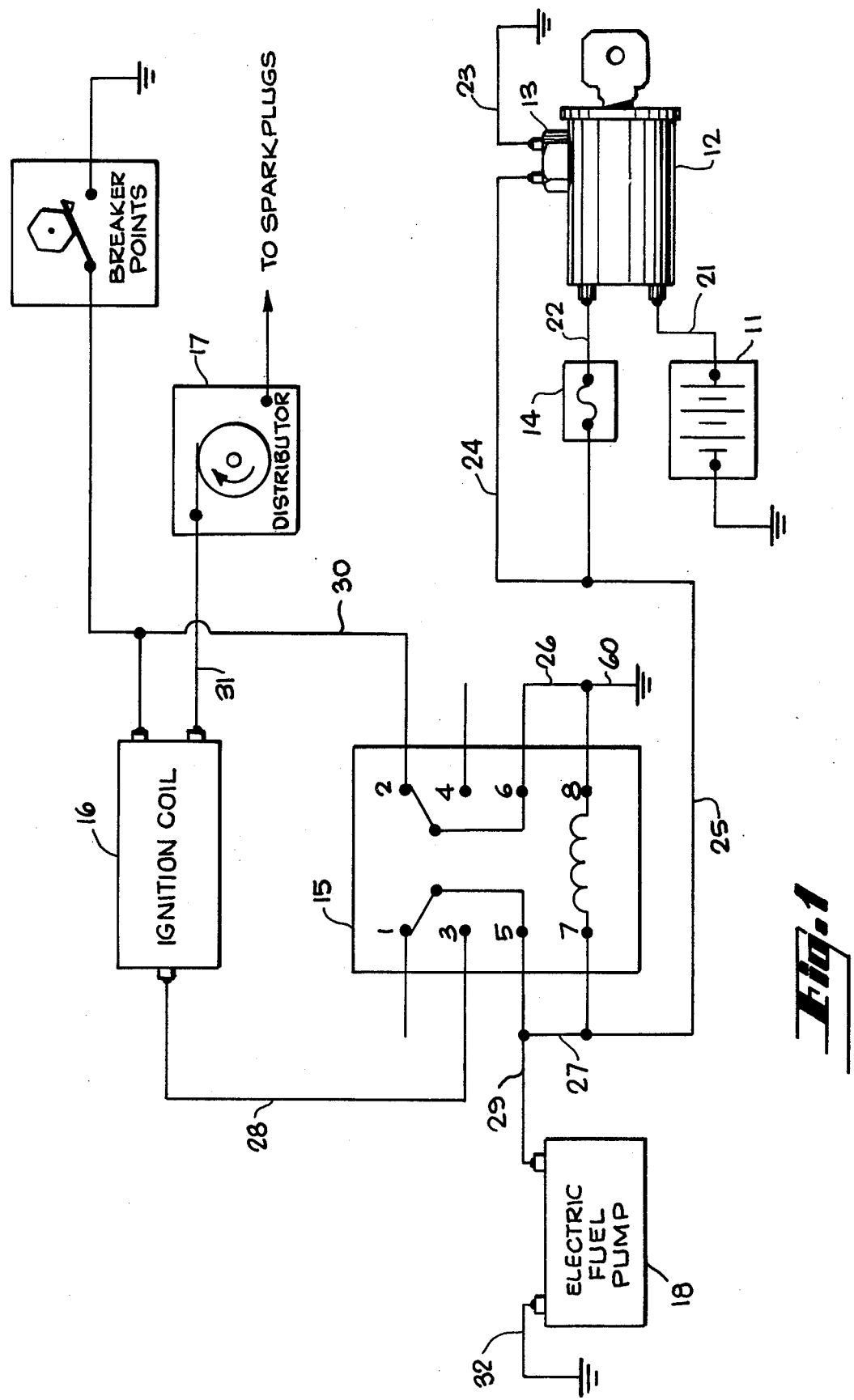
FIG. 1 is a schematic illustration of the present invention installed in a conventional automobile having an electric fuel pump.

Referring to FIG. 1, a conventional automobile has a battery 11 which is grounded at one terminal and connected at the other terminal through a conductor 21 to one terminal of the ignition switch 12. An auxiliary switch 13 is attached to the housing of the ignition key cylinder in a location which is inaccessible and hidden from view. One terminal of the switch 13 is grounded. The second terminal of the ignition switch 12 is connected through conductor 22 to one side of a fuse 14. The other side of the fuse is connected through wire 24 to the second terminal of the switch 13, and through conductors 25, 27, and 29 to one terminal of the electric fuel pump 18. The other fuel pump terminal is grounded through wire 32.

Included in the circuit is a double-pole double-throw relay 15, having terminals labelled 1 through 8 in FIG. 1. The relay coil is connected to terminals 7 and 8. When the relay coil is energized with a flow of electric current, terminal 3 is connected to terminal 5, terminal 4 is connected to terminal 6, and terminals 1 and 2 are open. When the relay coil is de-energized, terminal 1 is connected to terminal 5, terminal 2 is connected to terminal 6, and terminals 3 and 4 are open. Conductor 27 connects terminals 5 and 7. Conductor 26 connects terminals 6 and 8, and terminal 8 is grounded through wire 60. As shown in FIG. 1, terminals 5 and 7 are thereby connected to one terminal of the electric fuel pump 18, one terminal of the fuse 14, and one terminal of the auxiliary switch 13. The relay 15 is mounted in a hidden and inaccessible location in the vehicle.

Terminal 3 is connected through conductor 28 to the input terminal of the ignition coil 16, which terminal is connected to one side of the primary winding of said coil. The other side of the primary winding is connected to the breaker points, and through wire 30 to terminal 2 of the relay. The secondary winding of the coil 16 is connected through conductor 31 to the distributor 17, and thereby to the spark plugs.

Under normal operation of the vehicle, the switch 13 is open. When the ignition switch is off, no voltage is developed in wires 22, 25, 27, or 29; the electric fuel pump 18 is turned off, and no current flows through the relay coil. Terminal 3 is therefore electrically open, and terminal 2 is connected to ground through terminal 6 and wires 26 and 60. The ignition coil and points are therefore grounded. It will be appreciated that the engine cannot be started by connecting a jumper wire from the battery to the ignition coil because of this ground connection. Furthermore, even if this ground connection is severed by a thief, the fuel pump is disabled. Thus, there are three different disablement mechanisms which must be defeated in order to operate the vehicle.

When the ignition switch is turned on, voltage is supplied through conductors 22, 25, 27 and 29 to the electric fuel pump 18, and through terminal 7 to the relay coil. The current flow through the relay coil causes terminals 5 and 6 to become connected, thereby supplying current to the ignition coil 16 through wire 28, and terminal 2 is further disconnected from ground. The vehicle may then be operated in the normal fashion.

Figure 4:
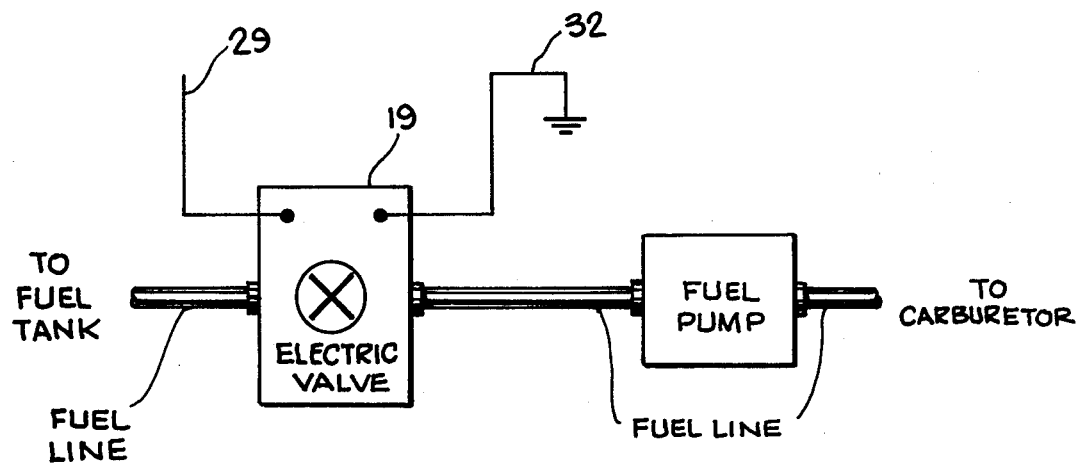
FIG. 4 is a schematic illustration of a portion of the circuit shown in FIG. 1 adapted to an automobile having a mechanical fuel pump.

Referring to FIG. 4, an alternative version of the present invention is provided for application to a vehicle having a mechanically driven fuel pump by connecting wire 29 to one terminal of an electrically actuated solenoid valve 19 located in the fuel line of the vehicle. The second terminal of the solenoid is grounded through wire 32. The valve is normally closed, and the fuel supply to the engine is shut off. When voltage is supplied to the solenoid through conductor 29, the valve opens and the vehicle may be operated in the normal manner. It will be seen that this system thus functions in the same manner as the system illustrated in FIG. 1.

Figure 5:
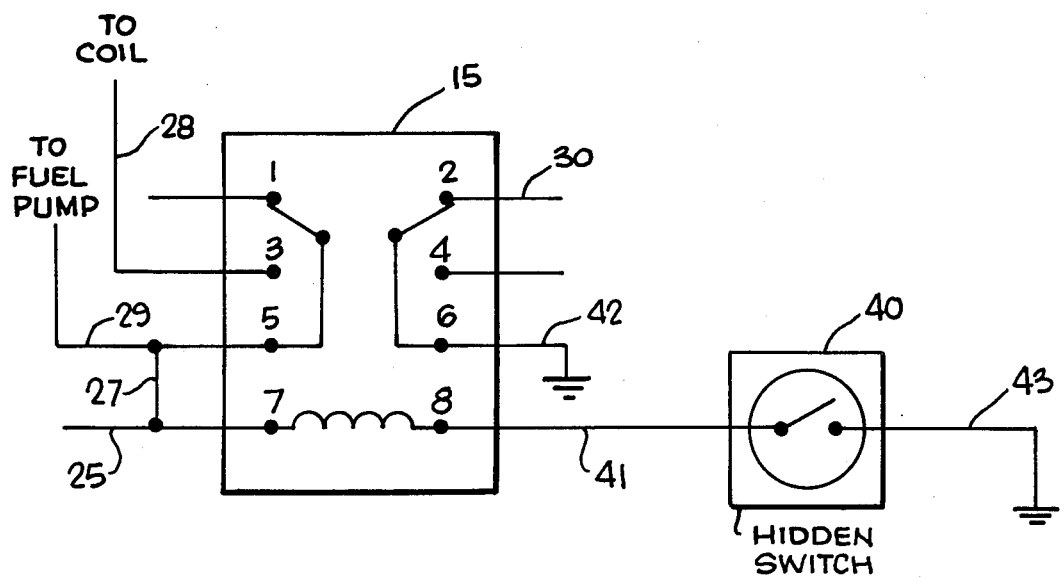
FIG. 5 is a schematic illustration of a portion of the circuit shown in FIG. 1, adapted for use in rental cars.

A further variation of the present invention is obtained by connecting terminals 6 and 8 of the relay in the manner illustrated in FIG. 5. Terminal 6 is connected to ground through conductor 42. Terminal 8 is connected through conductor 41 to one side of switch 40, the other side of which is grounded through wire 43. The remaining terminals of the relay are connected according to the system illustrated in FIG. 1. Switch 40 is preferably mounted in a hidden location in the vehicle, and may be key-operated. When this switch is turned off, it will be noted that the relay coil cannot be energized and the ignition system remains disabled. The switch 40 thereby comprises a fourth disablement mechanism which must be overcome by a potential thief. This version of the invention provides protection against a thief who rents an automobile to obtain a copy of the ignition key, and later returns to steal the car with the spare key.

Figure 2:
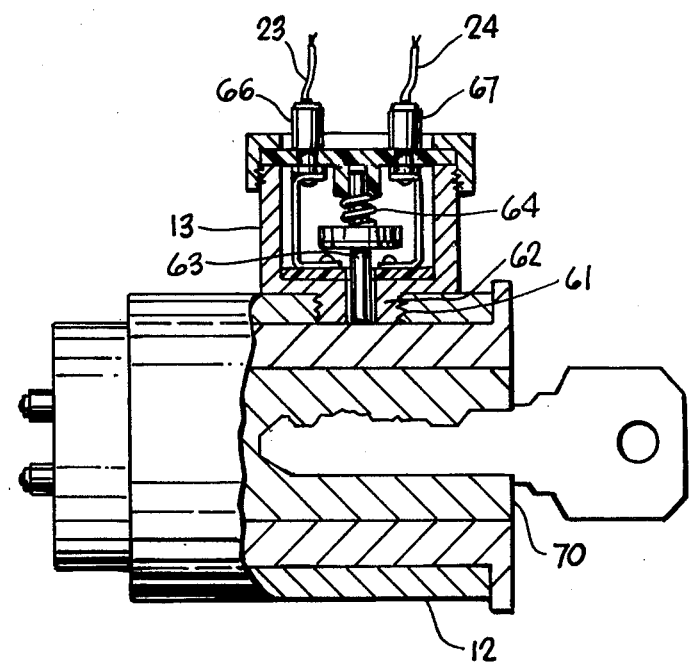
FIG. 2 is a partially schematic cutaway sectional view of the auxiliary switch of the present invention attached to the ignition key cylinder housing.

Referring now to FIG. 2, the switch 13 is mounted on the key cylinder housing 12 by means of a threaded projection or stud 62 which screws into a hole 61 tapped through the housing wall. A plunger 63 extends through a central axial hole in this stud, and is urged against the surface of the key cylinder 70 by a spring 64 located in the switch 13. In this position the terminals 66 and 67 of the switch 13 are disconnected.

Figure 3:
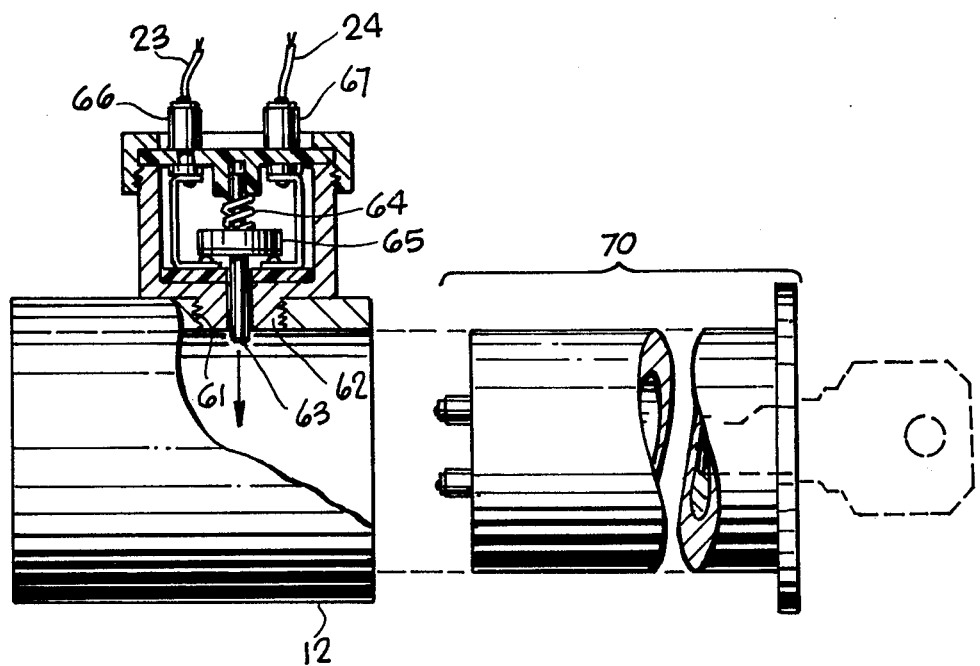
FIG. 3 is a partially schematic cutaway sectional view of the switch in FIG. 2 with the key cylinder removed from its housing.

When the key cylinder 70 is removed from the housing, as illustrated in FIG. 3, the plunger 63 is caused to project into the key cylinder opening by the action of the spring 64, and the spring action is arrested by a wafer 65 attached to the plunger and having an electrically conductive surface which comes to rest and is pressed by the spring against two electrical contacts connected to the terminals 66 and 67. The spring action and plunger displacement thereby closes an electrical connection between the switch terminals. The plunger extension into the key cylinder opening prevents the insertion of a spare cylinder into the housing.

Referring again to FIG. 1, the connection by foreign means of the exposed key cylinder contacts causes current to flow from the battery 11 through conductor 21 and 22, fuse 14, conductor 24, switch 13, and conductor 23 to ground. This circuit has negligible resistance, and the fuse 14 is blown by the overload, thereby disconnecting the relay terminal 7 from the ignition switch 12. The relay terminal 7 is further grounded through conductors 25 and 24, switch 13 and conductor 23. Thus it will be appreciated that when the key cylinder is removed, the relay coil and electric fuel pump are each grounded at both terminals and cannot be activated by jumper wires.

Referring now to FIG. 6, an alternative version of the invention is illustrated wherein the system is adapted for use in diesel-powered vehicles. Diesel engines do not have an ignition system. However, the electrical starter motor 52 is activated through a third terminal on the key switch 12, which is connected to wire 50 as shown in FIG. 4. The opposite end of wire 50 is connected to terminal 7 on the relay, and terminal 7 is connected to terminal 5 through conductor 27. Terminal 3 is connected through conductor 51 to one terminal of the starter motor 52. The other terminal of the starter is grounded through wire 53. Terminal 4 of the relay is connected through conductor 55 to one terminal of the electric fuel pump 18, the other terminal of which is connected to ground through wire 32. Terminal 6 of the relay is connected through wires 54 and 24 to one terminal of the switch 13, and to one terminal of the fuse 14. The remainder of switch 13 and fuse 14 and the battery 11 are connected to the key switch 12 in the same manner as in the system illustrated in FIG. 1. Terminal 8 of the relay is grounded.

It will be appreciated that the fuse 14 and switch 13 of FIG. 6 function in the same manner as the corresponding elements of the system illustrated in FIG. 1. When the key switch 12 is closed, the three key switch terminals are connected, and electric current is supplied through wire 50 to the relay coil. The relay is thereby closed, and current is further supplied to the starter through wire 51, and to the fuel pump through wire 55. When the key switch is off and the relay is open, the starter circuit and fuel pump circuit are isolated from each other. Therefore a jumper wire attached to either the fuel pump or the starter will leave the vehicle in a disabled condition. When the key cylinder is removed and the key switch contacts are crossed, the fuse 14 will blow out, and the fuel pump circuit will be disabled. Thus, a potential thief must overcome several disablement mechanisms to operate the vehicle.

The specific systems disclosed hereinabove do not exhaust the possible versions of this invention. The detailed description given here is solely for purposes of example and illustration of the preferred embodiment, and numerous changes in the details of construction and the combination and arrangement of the parts may be made without departing from the spirit and the scope of the invention as hereinafter claimed.

What is claimed is:

1. An anti-theft system for a motor vehicle having an electrical ignition system and a fuel line, comprising:
   valve means attached to said fuel line for allowing or inhibiting the flow of fuel in the line in response to an electrical signal;
   first circuit means connecting said valve means to the ignition switch of said vehicle, whereby the flow of fuel is turned on or off when the ignition switch is on or off, respectively;
   electrical relay means connected to and actuated by said ignition switch; and
   second circuit means connecting said relay means to the coil of said ignition system, such that said coil is either supplied voltage or grounded in response to the actuation or de-actuation of said relay means;
   wherein the ignition switch which is connected to and actuates said relay means includes a housing support holding a key cylinder and switch contacts, such that said switch contacts are closed by rotating said key cylinder in said housing support, and such that said ignition switch is operated by a key inserted into said key cylinder and connects an electrical power source to the motor vehicle electrical system said anti-theft system further comprising:
   switching means actuatable by the removal of the key cylinder from said system;
   fuse means in the electrical circuit of the power source for said system; and
   third circuit means connecting said switching means to said fuse means, such that said power source is disconnected from portions of said electrical system by said fuse means upon removal of said key cylinder and connection of its switch contacts.

2. An anti-theft system as recited in claim 1, wherein said switching means, upon removal of said key cylinder, provides a mechanical obstruction preventing replacement of said key cylinder.

3. An anti-theft system as recited in claim 2, wherein said switching means comprises an electrical switch attached to the housing support for said key cylinder, having a spring-actuated plunger pressing against said key cylinder, such that when said key cylinder is removed said plunger is urged into the space occupied by said key cylinder and said switch is closed.

4. An anti-theft system as recited in claim 3, wherein said fuse means comprise a fuse connected in series between said electrical power source and said portions of the motor vehicle electrical system, and wherein the terminal on the load side of said fuse is connected to one terminal of said switching means, the opposite terminal of said switching means being grounded.

5. An anti-theft system as recited in claim 4, further comprising a third switch connected to said relay means whereby the actuation of said relay means may be disabled by means of said third switch.

6. An anti-theft system as recited in claim 1, 2, 3, 4, or 5, wherein said relay means is a double-pole relay, and wherein one pole switch of the relay is connected to the input terminal of said coil and the other pole switch of the relay is connected to the breaker point terminal of the coil.

7. An anti-theft system as recited in claim 1, 2, 3, 4, or 5, wherein said valve means comprises an electrical fuel pump.

8. An anti-theft system for a motor vehicle having a diesel engine, comprising:
   valve means attached to the fuel line of said engine for allowing or inhibiting the flow of fuel to said engine in response to an electrical signal;
   relay means connected to a switch which supplies electrical power to actuate the relay;
   first circuit means connecting said valve means to said relay means; and
   second circuit means connecting said relay means to the starter motor of said engine, such that the actuation of said relay means causes power to be delivered to said valve means or starter motor through said first or second circuit means, respectively;
   wherein the ignition switch which is connected to and actuates said relay means includes a housing support holding a key cylinder and switch contacts, such that said switch contacts are closed by rotating said key cylinder in said housing support, and such that said ignition switch is operated by a key inserted into said key cylinder and connects an electrical power source to the motor vehicle electrical system, said anti-theft system further comprising:

switching means actuatable by the removal of the key cylinder from said system;

fuse means in the electrical circuit of the power source for said system; and third circuit means connecting said switching means to said fuse means, such that said power source is disconnected from portions of said electrical system by said fuse means upon removal of said key cylinder and connection of its switch contacts.

9. An anti-theft system as recited in claim 8, wherein said switching means, upon removal of said key cylinder, provides a mechanical obstruction preventing replacement of said key cylinder.

10. An anti-theft system as recited in claim 9, wherein said switching means comprises an electrical switch attached to the housing support for said key cylinder, having a spring-actuated plunger pressing against said key cylinder, such that when said key cylinder is removed said plunger is urged into the space occupied by said key cylinder and said switch is closed.

11. An anti-theft system as recited in claim 10, wherein said fuse means comprise a fuse connected in series between said electrical power source and said portions of the motor vehicle electrical system, and wherein the terminal on the load side of said fuse is connected to one terminal of said switching means, the opposite terminal of said switching means being grounded.

12. An anti-theft system as recited in claim 11, further comprising a third switch connected to said relay means whereby the actuation of said relay means may be disabled by means of said third switch.

13. An anti-theft system as recited in claims 8, 9, 10, 11, or 12, wherein said relay means comprises a double-pole relay, and wherein said first circuit means connects said valve means to one relay pole switch and said second circuit means connects said starter motor to the other relay pole switch.

14. An anti-theft system as recited in claim 8, 9, 10, 11, or 12, wherein said valve means comprises an electrical fuel pump.

* * * * *